United States Patent
Lawther et al.

(10) Patent No.: US 7,793,121 B2
(45) Date of Patent: Sep. 7, 2010

(54) CHARGING DISPLAY SYSTEM

(75) Inventors: Joel S. Lawther, East Rochester, NY (US); Michael J. Telek, Pittsford, NY (US); Joseph A. Manico, Rochester, NY (US); John R. Fredlund, Rochester, NY (US); Timothy J. Wood, Rochester, NY (US); Geoffrey W. Brown, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 743 days.

(21) Appl. No.: 11/680,699

(22) Filed: Mar. 1, 2007

(65) Prior Publication Data
US 2008/0211458 A1 Sep. 4, 2008

(51) Int. Cl.
*G06F 1/00* (2006.01)
*H01M 10/44* (2006.01)
*H01L 31/00* (2006.01)

(52) U.S. Cl. .................. 713/300; 320/101; 136/243
(58) Field of Classification Search ................ 713/300; 320/101; 136/243
See application file for complete search history.

(56) References Cited

U.S. PATENT DOCUMENTS

| | | | |
|---|---|---|---|
| 4,392,102 A | 7/1983 | Sugalski et al. | |
| 5,455,466 A | 10/1995 | Parks et al. | |
| 5,498,949 A | 3/1996 | Dowe | |
| 5,602,458 A | 2/1997 | Dowe | |
| 5,801,512 A | 9/1998 | Adams et al. | |
| 6,054,846 A | 4/2000 | Castleman | |
| 6,074,775 A * | 6/2000 | Gartstein et al. | 429/53 |
| 6,555,990 B1 | 4/2003 | Yang | |
| 6,798,716 B1 | 9/2004 | Charych | |
| 7,042,196 B2 | 5/2006 | Ka-Lai et al. | |
| 7,068,991 B2 | 6/2006 | Parise | |
| 7,113,981 B2 | 9/2006 | Slate | |
| 7,514,899 B2 * | 4/2009 | Deng-Peng | 320/101 |
| 7,518,267 B2 * | 4/2009 | Baarman | 307/150 |
| 2003/0210106 A1 | 11/2003 | Cheng et al. | |
| 2005/0161079 A1 | 7/2005 | Gray | |
| 2006/0108974 A1 | 5/2006 | Castillo | |
| 2006/0119734 A1 | 6/2006 | Neel | |
| 2006/0181242 A1 | 8/2006 | Freed et al. | |

(Continued)

FOREIGN PATENT DOCUMENTS

EP 1 096 641 5/2001

(Continued)

*Primary Examiner*—Stefan Stoynov
(74) *Attorney, Agent, or Firm*—Roland R. Schindler

(57) ABSTRACT

In one aspect, a method is provided for operating a charging display system that is capable of wirelessly charging a rechargeable device positioned on a connector-less charging surface. In accordance with the method, the presence of a chargeable device on the charging surface is detected and the type of the chargeable device is identified. A set of interaction options based upon the identity of the chargeable device with the set, including a charging interaction option, is determined and, a displayable output signal based upon the determined set interaction options is generated. The set of interaction options is initiated based upon the detected presence of the chargeable device on the charging surface and the identified device type and, the output signal is presented on a display of the charging device.

19 Claims, 11 Drawing Sheets

U.S. PATENT DOCUMENTS

| | | | |
|---|---|---|---|
| 2006/0253638 A1 | 11/2006 | Oliver et al. | |
| 2007/0069684 A1* | 3/2007 | Ramsden | 320/101 |
| 2008/0126927 A1* | 5/2008 | Jha | 715/700 |

FOREIGN PATENT DOCUMENTS

| | | |
|---|---|---|
| JP | 08-19189 | 1/1996 |
| WO | 02/15320 | 2/2002 |
| WO | 2006/001557 | 1/2006 |

* cited by examiner

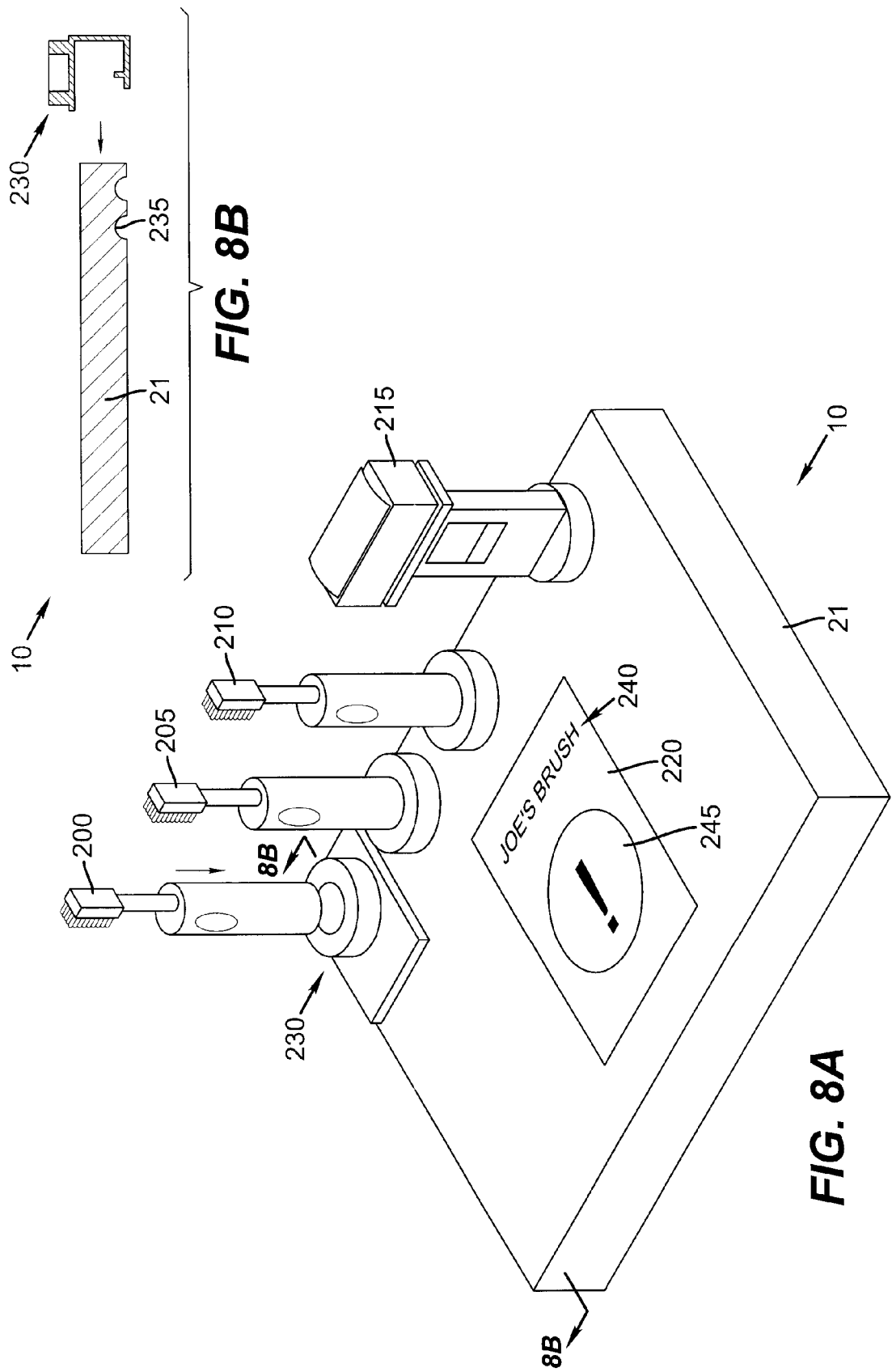

CHARGING DISPLAY SYSTEM

FIELD OF THE INVENTION

The invention relates to charging systems that charge rechargeable devices.

BACKGROUND OF THE INVENTION

A continuing trend in consumer electronic devices such as portable music players, cellular phones, computers, cameras, key chains with storage memory and the like is reduced size. Largely, this trend has been made possible through advances in the miniaturization of the electronic components of such devices. This trend has led, for example, to the creation of consumer electronic devices that are scaled on the order of a few centimeters. Such small-scale devices enable consumers to carry a vast array of electronic capabilities with them.

Unfortunately, battery and other energy storage technologies have not kept pace with this miniaturization trend. Accordingly, as the size of the device has been reduced, smaller batteries are being incorporated into such portable consumer electronic devices. This means that such devices require more frequent recharging and that such devices often require recharging on a daily basis.

It will be appreciated that user convenience is an important feature in the success of consumer products. People have little time or coordination for finding the small connectors to charge these tiny consumer electronic devices and sorting through multiple connectors and chargers to find the right one for a given device and then walk them to a PC for connecting. Further, people often distribute chargers for different devices throughout the home and in places that are related to the usage of the device. For example, a typical charger for a cellular phone can be located in a kitchen or on a dresser, while a charger for a picture-viewing device, video viewing device, a portable music device, or personal digital assistant may be in the family room or den in close proximity to a personal computer. It is often inconvenient to distribute such portable consumer electronic devices for charging each day and to collect such devices when it is time to leave the home.

Moreover, it will be appreciated that user interface technology has also adjusted to this trend in that some small-scale devices have incorporated proportionately smaller displays and smaller user controls. This makes it increasingly difficult to present all of the status information regarding the electronic device on such smaller displays at one time. For example, consumers typically need to know when an electronic device is working, is interacting with a charger such as by being charged or routing data to and/or from the device. A wide variety of indicators, such as status icons, can be used to present such information to a user. As displays get smaller, the size of the indicators must get smaller. However, the ability of people to read indicators and other forms of information presented by a display has remained effectively fixed. Accordingly, manufacturers have typically elected to reduce the number of indicators presented on the display at one time. This prevents a user from determining the status of the device with a single glance as is desired by the user. In addition, when charging multiple devices simultaneously, the status of individual units must be individually checked.

Further, the average size of a person's fingers and the average dexterity in the use of a person's fingers has not improved in concert with the miniaturization of controls on such devices. This leads to frustration during the operation of the device. The devices mentioned have also gained a great deal of memory storage capacity in the forms of miniaturized Hard Drives and high capacity removable memory cards. With this new capacity, small portable devices such as cameras, music players, and personal media players can hold literally thousands of songs and photographs and hundreds of hours of video. Navigating, scrolling through, or selecting individual media elements from this amount of content is a daunting task when provided with only a tiny screen and limited user interface.

Accordingly, many small consumer electronic devices to simply omit display technology from the device and/or to reduce the number of controls incorporated therein. Either of these trends makes such consumer electronic devices more difficult to interact with. To attempt to solve this problem, docking stations are provided for such devices that have connectors that establish communication and power transfer links between the electronic device and a separate terminal, such as a personal computer. This allows the users of such devices to interact with the electronic device by way of a separate terminal, such as a personal computer, while also recharging the battery of the device. If a docking system is used, it is typically designed to interface with a single type and model of device. Some docking systems such as the EASYSHARE Camera Dock 6000, are provided with mechanical and electro-mechanical adapters to accommodate a limited set of compatible camera models. With this approach the user has to locate the appropriate adapter and use it to configure the dock in order to charge the designated camera and interface it with a personal computer. For multiple devices multiple docks would be required adding to the number of cables, reducing the number of available communications ports, and reducing the amount of available table or desk surface.

Further, if a compact electronic device is configured for charging and synchronization with a particular computer, and that computer is in use by another user, even wireless data transfer would have to wait until the computer was available. With a wireless charger the user would have to wait until the compact electronic device was sufficiently charged for the device display to function, in order to interface with the unit.

What is needed is a new approach that is capable of charging any of a plurality of devices from a central location, and that also enables consumers to better interact with small scale devices without requiring proximity to a personal computer.

BRIEF DESCRIPTION OF THE DRAWINGS

FIG. 8 shows a perspective view of multiple rechargeable personal hygiene devices confronting a contact surface and a display presenting an output signal.

SUMMARY OF THE INVENTION

In one aspect, a method is provided for operating a charging display system that is capable of wirelessly charging a rechargeable device positioned on a connector-less charging surface. In accordance with the method, the presence of a chargeable device on the charging surface is detected and the type of the chargeable device is identified. A set of interaction options based upon the identity of the chargeable device with the set, including a charging interaction option, is determined and, a displayable output signal based upon the determined set interaction options is generated. The set of interaction options is initiated based upon the detected presence of the chargeable device on the charging surface and the identified device type and, the output signal is presented on a display of the charging device.

DETAILED DESCRIPTION OF THE INVENTION

Figure 1:
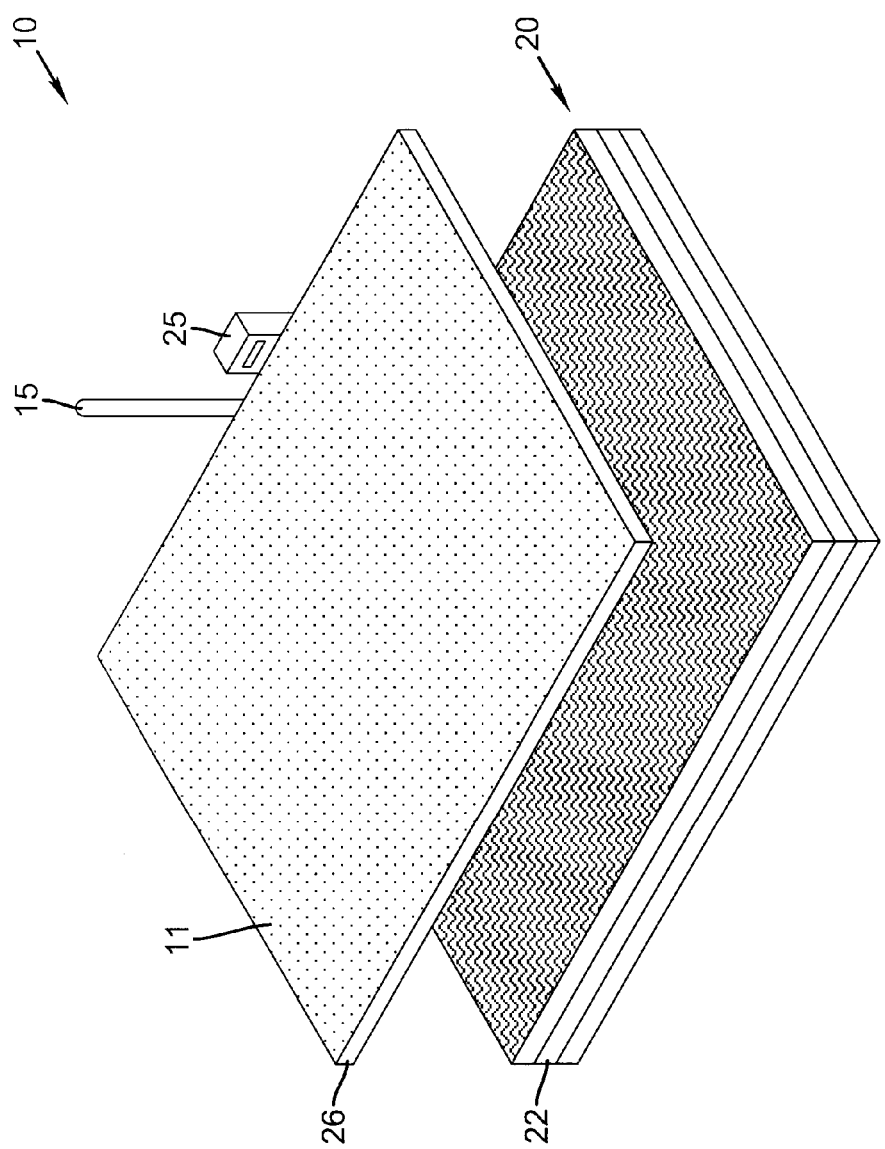
FIG. 1 is an exploded perspective view of one embodiment of a charging display system.
Figure 2:
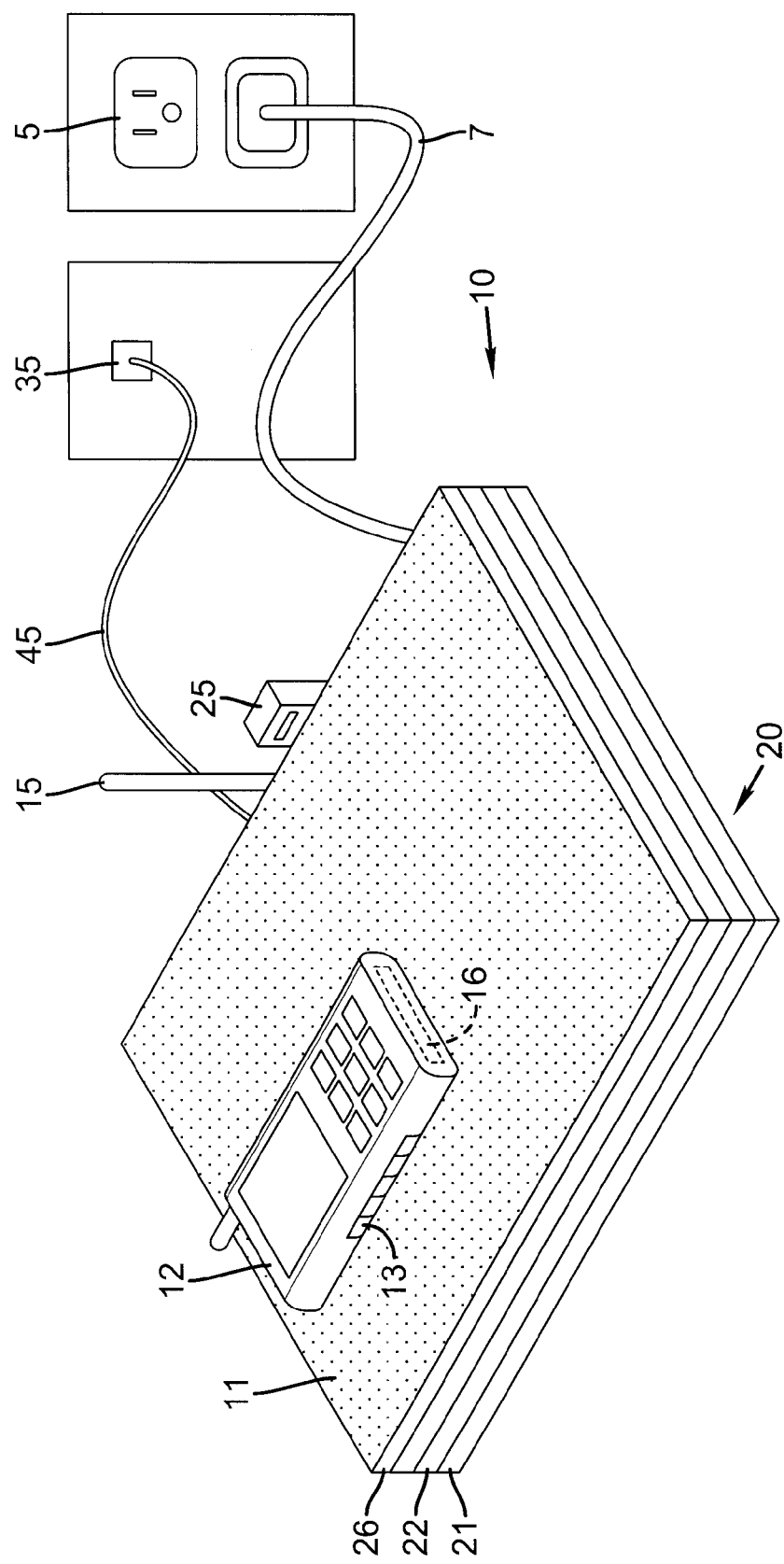
FIG. 2 is a perspective view of an embodiment of FIG. 1 with a contact surface of the charging display system.

FIG. 1 illustrates an exploded perspective view of one embodiment of a charging display system 10, while FIG. 2 illustrates a perspective view of the embodiment of FIG. 1 in an unexploded view and with a rechargeable device 12 positioned thereon. In the embodiment that is illustrated in FIGS. 1 and 2, charging display system 10 has a contact surface 11 against which a power receiving element 13 of a rechargeable device 12 can be positioned. A connector-less charging system 20 receives power from a power source 5, illustrated here as an AC receptacle that is connected to connector-less charging system 20 by way of a power cord 7 which includes a power signal generator 22 that converts the received power into a power signal that travels through contact surface 11 and that is received by a power receiving element 13. Power receiving element 13 has transducer circuit or other power signal receiving circuit that receives the power signal and that converts the power signal into a form that can be stored in a power supply 16 of the rechargeable device 12.

The power signal can take the form of any signal that can transmit power from power signal generator 22 to power receiving element 13 without requiring a connector, or other mechanical structure, to provide a physical conduit for the power signal to travel between power signal generator 22 and power receiving element 13. For example, and without limitation, the power signal can take the form of a broadcast, narrow cast or inductive signal and can use, for example and without limitation, any one or a combination of the following well known power conveying signals, such as inductive signals, light signals, radio-frequency signals, kinetic signals, magnetic signals and/or electromagnetic signals.

Examples of circuits and systems that are capable of generating inductive type power signals are described, for example, in U.S. Pat. No. 3,840,795, entitled "A Hand Held Battery Operated Device And Charging Means Therefore", assigned to SUNBEAM CORP and, U.S. Pat. No. 5,959,433, entitled "Universal Inductive Battery Charger System", assigned to CENTURION INTL INC. Some inductive chargers, such as the Wild Charger™ pad by Wild Charge Inc., are known that can deliver up to 90 W of power, enough to simultaneously charge laptops and small devices such as cell phones, smart phones, portable music players, digital cameras and the like. Other wireless charging systems such as the Splashpad™ by Splashpower Ltd. and, eCoupled from Fulton Innovation LLC provide similar capabilities. With these inductive type of wireless chargers, multiple compatible devices can be placed on the charger pad in any orientation as long as the charging receiver is in close proximity to the charging pad.

Other known systems that are capable of generating such power signals describe the use of a power signal in the form of emitted visible or non-visible light. Examples of this type include: U.S. Pat. No. 6,707,274, entitled "Optical Battery Recharger" and, U.S. Pat. No. 7,079,722, entitled "Apparatus and Method for Transmitting Electrical Power Through a Transparent or Substantially Transparent Medium", assigned to Maxentric Technologies LLC. Each of these use a power signal generator 22 that incorporates an artificial light source, such as an electrically powered lamp, to generate a power signal to transfer energy to a rechargeable device 12 equipped with a power receiving element that employs a photovoltaic cell, or cell array, or other type of circuit or system that converts light into power that can be stored in power supply 16 of rechargeable device 12. As with the electrical induction techniques the photovoltaic approaches do not require electrical connection, direct physical contact, or fixed orientation, and can be used to charge multiple rechargeable devices simultaneously. As long as the power signal is directed at the photovoltaic cells, or other light to power converting circuit or system of power receiving element 13 of rechargeable device 12, energy will be transferred. U.S. Pat. No. 7,079,722 also illustrates that sufficient amounts of electrical power, can be transmitted in the form of light through a transparent or substantially transparent medium.

Radio frequency and other frequencies of electromagnetic radiation that are presently used for wireless data transfer can also be used to provide a power signal that enables connector-less charging. For example, frequencies and protocols that are known from wireless data transfer techniques such as Bluetooth, IrDA, wireless networks, and the like can be used in determining the form of the power signal. In certain embodiments, power signals of this type can also be used to transfer data between the charging display system 10 and the rechargeable device 12. For example, wireless chargers, such as eCoupled from Fulton Innovation LLC., use a power signal that is modulated or otherwise adapted to also perform the function of transferring data.

In the embodiment of FIGS. 1 and 2, charging display system 10 is equipped with an optional antenna 15 for radio frequency wireless communication with rechargeable device 12, and an infrared communication port 25 for light based wireless communication with rechargeable device 12. A wired connector 35 is illustrated that facilitates communication between charging display system 10 and a communication network such as a computer or other data network, a cellular or other telecommunication network.

As is illustrated in FIGS. 1 and 2, a display 26 is positioned between power signal generator 22 and contact surface 11. Contact surface 11 is generally transparent to allow light generated by or modulated by display 26 to pass through contact surface 11 so that such light is visible to a person observing a recharging device 12 while positioned on contact surface 11. As illustrated, display 26 can be any generally thin display technology, for example, a liquid crystal display, organic light emitting display, or other substantially thin display can be used in conjunction with a light based, electromagnetic or inductive charging system. A wide variety of display technologies can be used for display 26 including but not limited to displays of the type that use emissive, transmissive or reflective image elements.

Display 26 can be placed in close proximity to or in contact with contact surface 11. Display 26 can also be constructed as one device with contact surface 11, and optionally formed or assembled as a laminar structure. Further, display 26 can optionally be constructed, formed, or assembled as one device with power signal generator 22 and/or any other components of connector-less charging system 20, potentially sharing laminar structures, such as electronic coatings, electronic printings, conductors, glass insulating structures, and the like.

Charging display system 10 is configured so that presence of display 26 between signal generator 22 and contact surface 11 typically does not significantly degrade the intensity of the power signal and, conversely, that the operation of display 26 should not negatively impacted by the power signal. In essence, display 26 is to be generally transparent to the power signal. This result can be achieved by selecting a power signal having particular characteristics that are not easily interfered with. For example, the power signal can have a wavelength, frequency or other characteristics that enable the power signal to pass through display 26 and contact surface 11 with minimal interference. Further, display 26 can have a design, a selection of materials, and/or can be manufactured so that it is not particularly sensitive to the power signal or that is shielded from the power signal.

Figure 3A:
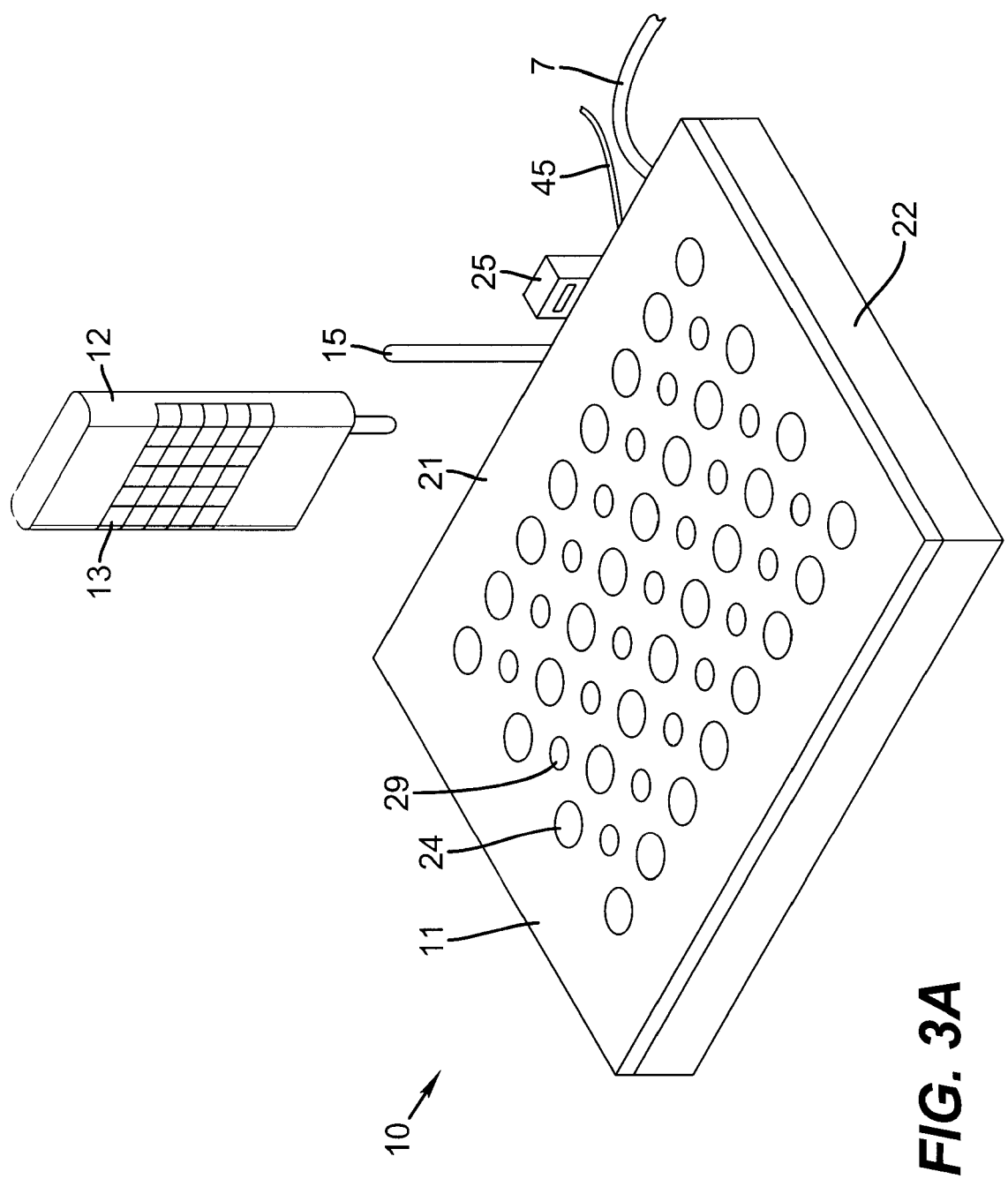
FIG. 3A shows a perspective view of a rechargeable device that can be charged by exposure to a light type power signal approaching the charging display system that generates a light type power signal.

FIG. 3A shows a perspective view of one embodiment of charging display system 10 having a power signal generator 22 comprising a plurality of separately controllable connector-less charging elements 24, while rechargeable device 12 is equipped with a photovoltaic type of power receiving element 13.

Figure 3B:
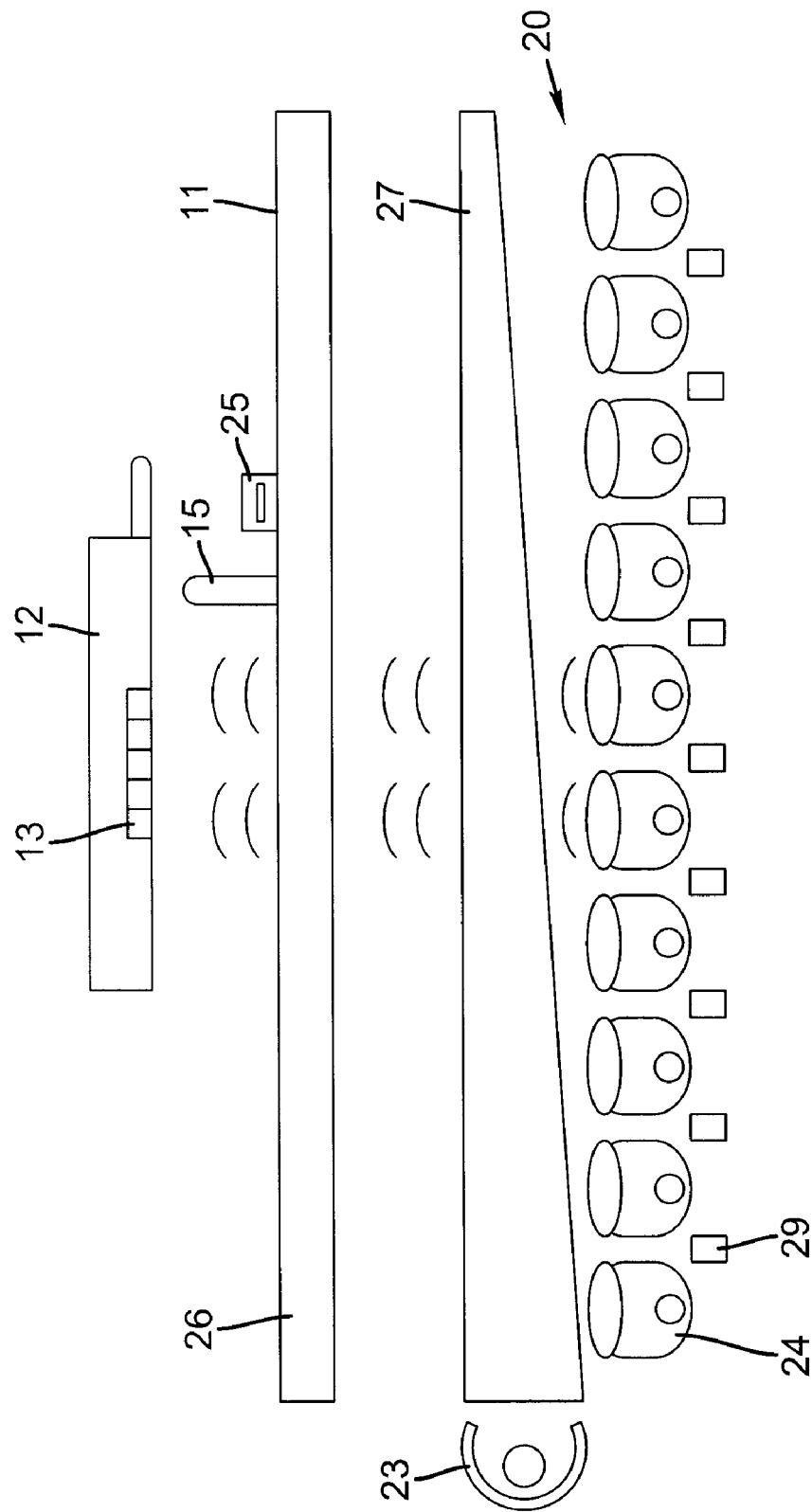
FIG. 3B is an exploded view of the charging display system of FIG. 3A with a rechargeable device on a contact surface of the charging display system.

FIG. 3B is an exploded view of the embodiment of charging display system 10 of FIG. 3A, illustrating display 26 in conjunction with a primary display illumination device 23, connector-less charging elements 24 that emit a power signal in the form of light, a light guide 27 for display 26, and a plurality of device sensors 29. In this embodiment, device sensors 29 can be photodiodes, opto-interruptors, or imaging arrays such as CMOS or CCD type imagers. Device sensors 29 are adapted to sense the presence of rechargeable device 12 on contact surface 11. Signals generated by device sensors 29 can also be used to determine a device identification or to enable charging display system 10 to receive a power signal, or data signal from rechargeable device 12, as will be discussed below.

In this embodiment, charging display system 10 is adapted to provide a dynamic masking of the power signal so that the light emitting type of power signal travels from illumination sources, such as a display illumination system 23 and connector-less charging element 24, through selected portions of contact surface 11 that confront or otherwise illuminate power receiving element 13.

In this regard, optional device sensors 29 are provided that are adapted to detect light that is reflected by rechargeable device 12 so that the location and orientation of rechargeable device 12 on contact surface 11 can be determined.

Accordingly, the signals from device sensors 29 can be used to determine which of the plurality of connector-less charging elements 24 are caused to radiate a light which passes through display 26, through contact surface 11 and to power receiving element 13. For example, device sensors 29 can sense a pattern of light reflected by rechargeable device 12 at one intensity level and light that is reflected by rechargeable device power receiving element 13 at a second, lower intensity. To conserve power, the pattern of light emitting connector-less charging elements 24, used to emit the power signal, can be matched to the location, pattern and orientation of power receiving element 13, as indicated by the reflected light that is sensed. Such a process can be executed in an iterative manner of determining which connector-less charging element 24 radiates light that is reflected to a device sensor 29 in a way that suggests that such light was reflected by a power receiving element 13, and using the determined charging elements 24 to supply power to rechargeable device 12.

In another embodiment, connector-less charging elements 24 can be cycled one by one while charging display system communicates with rechargeable device 12 to determine whether activation of a particular connector-less charging elements 24 increases the intensity of the power signal received by power receiving element 13 of device position on the charging display system 10. This process, likewise, can be iteratively repeated until rechargeable device 12 senses receiving a power signal that is approaching a maximum intensity, or until all of the charging elements have been selectively operated with only those that provide a meaningful contribution to charging of rechargeable device 12 remain illuminated.

Similar results can be achieved through actual masking. For example, where display 26 is of a liquid crystal type that modulates backlight, a similar process can be used to determine which portions of the display 26 are to be unmodulated to enable charging of rechargeable device 12 with little signal loss in the power signal.

Where desirable, remaining connector-less charging elements 24, can illuminate at a reduced level for backlighting display 26, so as to eliminate the need for a separate illumination source for display 26. Alternatively, the remaining illumination sources can be off while the primary illumination system 23 for the display provides the backlight for an LCD type display 26. Other sources for display illumination can be substantially transparent OLED structures operating in conjunction with or without secondary connector-less charging elements 24.

A problem that may be encountered in the charging process may be the absorption of power from the power signal by display 26 which may distort or shorten the life of display 26. Such a problem can be addressed, at least in part, by the above described considerations in the design, materials, and manufacturing of display 26. To provide further protection, display 26 can be operated to provide advanced protection against unintended consequences of such absorption. For example, portions of display 26 through which the power signal from signal generator 22 will pass can be disabled or adjusted to a relatively transparent position in such areas of display 26. Alternatively, operating frequencies of the refresh signals used to operate display 26 can be selected or adjusted to a frequency that results in minimal generation of power signal induced effects by display 26.

Figure 3C:
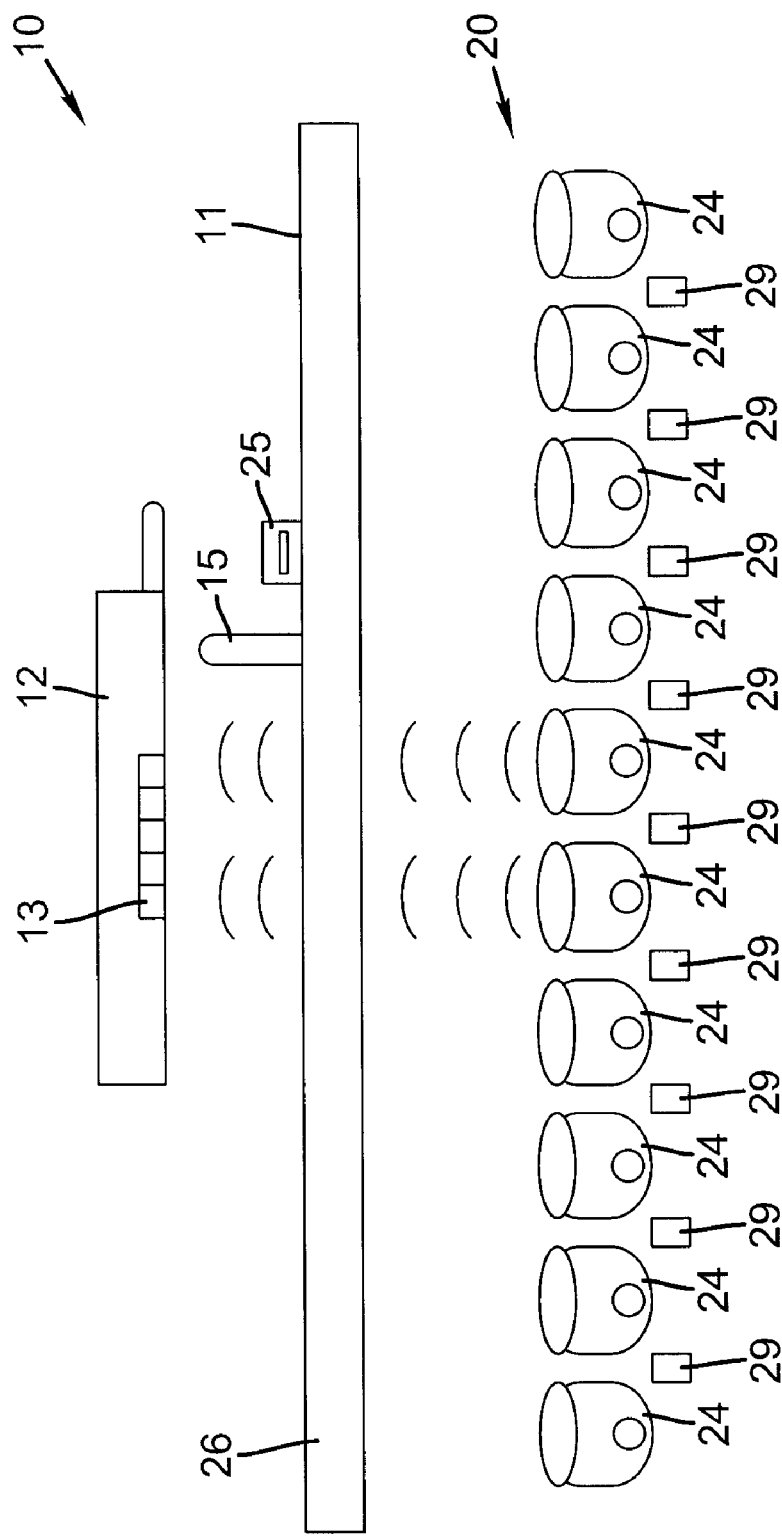
FIG. 3C is an embodiment of a charging display system where the display is a substantially transparent OLED.

FIG. 3C is an embodiment of charging display system 10, where display 26 is a substantially transparent OLED. For device presence, emission comes from the individual OLED components and device sensors 29 detect light emitted by the OLED that has been reflected by rechargeable device 12. Alternatively, it is known in the art that OLED emitters have the capability to create current when exposed to light. Thus, the emitters of such an OLED display can provide the functions of device detection, display illumination and connector-less charging. Optional connector-less charging elements 24 can also be employed to illuminate power receiving elements 13 to provide power to the rechargeable device 12 through elements on the OLED. Furthermore, in FIG. 3C, wireless communication system 14 of rechargeable device 12 can communicate with a wireless communication system, such as the wireless communication system 94 illustrated in FIG. 4A, and described in greater detail below. A charging display system 10 can use signals from such a wireless communication system to provide input to controller 32 as to which of the connector-less charging elements 24 (i.e. lamps and or OLED elements) are contributing to charging of rechargeable device 12.

Figure 4A:
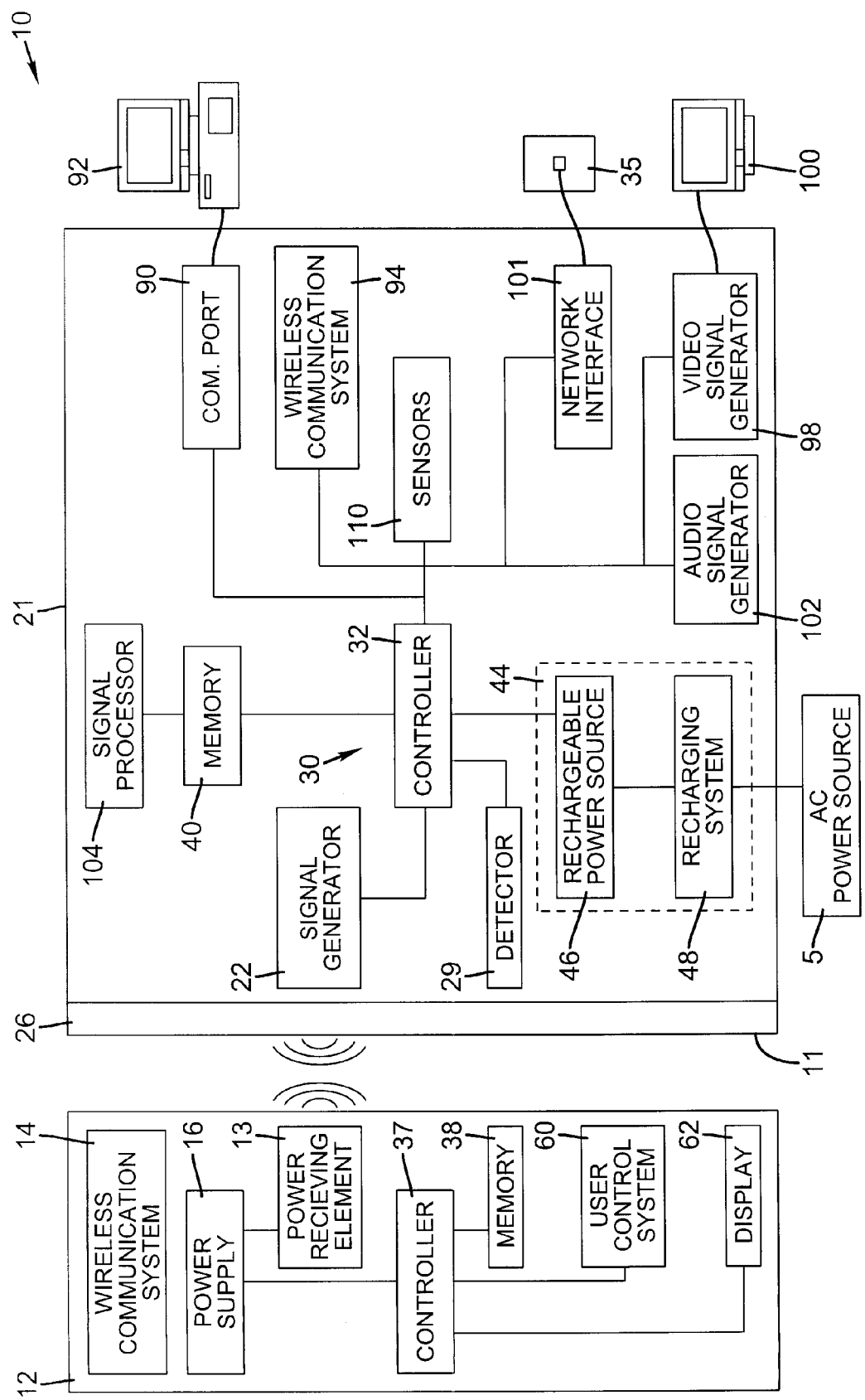
FIG. 4A is a schematic block diagram of one embodiment of the charging display system and an example of a rechargeable device.

FIG. 4A shows a schematic illustration depicting a logical and electrical connection between charging display system 10 and rechargeable device 12. As is shown in FIG. 4A, charging display system 10 comprises a control system 30 comprising a controller 32. Charging display controller 32 cooperates with power signal generator 22 to generate signals that are appropriate for data communication and power exchange therethrough. Charging display controller 32 can comprise any circuit or system capable of controlling operation of charging display system 10 as described herein including, but not limited to, a microprocessor, microcontroller, ASIC, programmable analog device or combination of discrete electronics.

Charging display controller 32 is adapted to enable the transfer of data between rechargeable device memory 38 and charging display system memory 40. In one embodiment, this can be done using power signal generator 22 and device sensor 29, respectively, to send and to receive power signals that have been modulated to carry data. Any known type of communication system or circuit adapted to receive wireless signals and power can be used for this purpose. Alternatively, wireless communication system 94 can be used to exchange data with wireless communication system 14 in rechargeable device 12. As used herein, the term data comprises data representing one or more still images, sequences of still images, video sequences, video streams, audio sequences, metadata including information about the such still images, sequences of still images, video sequences, video streams, audio sequences, and any other text or data known in the art that can be stored in rechargeable device memory 38.

Charging display system 10 can have a controller 32 that is adapted to execute data uploads and/or downloads and power charging without the involvement of a personal computer or similar device, however, a personal computer can be involved as desired. Recharging system 48 can receive power from an alternating current source, such as a power cord 7, providing a connection to a 110 volt or other voltage AC source.

In other embodiments, charging display system 10 can have a power supply 44 with an optional rechargeable power source 46, that is capable of storing and providing sufficient rechargeable device 12 to enable downloading of data stored thereon and recharging the rechargeable device power supply 16.

It will be appreciated that control of the recharging operation will typically be managed by controller 32 to avoid overheating of and/or damage to rechargeable device power supply 16. Accordingly, a power supply control circuit 52 is provided for managing the recharging operation. In the embodiment shown in FIG. 4A, controller 32 performs this function. Specifically, controller 32 is adapted to sense an amount of power remaining in a battery for rechargeable device 12 and to execute a recharging strategy where necessary. In one embodiment, controller 32 exchanges data with rechargeable device controller 37 to obtain data from rechargeable device 12 to determine power status. In another embodiment, controller 32 cooperates with a voltage sensor circuit (not shown) that is connected to rechargeable device power supply 16. Such a voltage sensor circuit can take any a variety of forms that are well known in the art for sensing a voltage level and for providing a signal from which a controller can make a determination as to whether to engage in a charging operation.

Figure 4B:
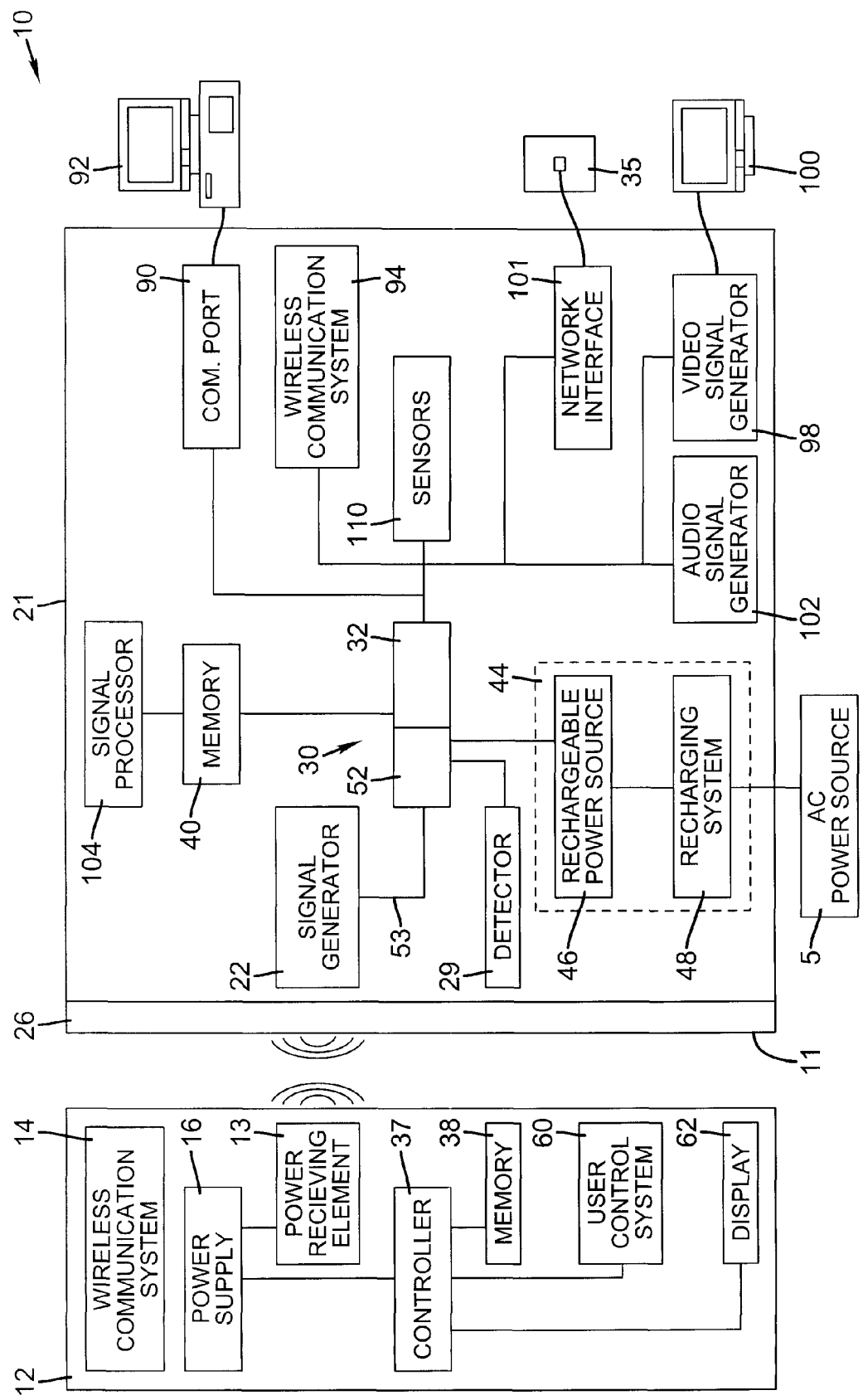
FIG. 4B is a schematic block diagram of another embodiment of the charging display system and a rechargeable device.

In still other embodiments, such as the embodiment of FIG. 4B, control system 30 includes a power supply control circuit 52 that is separated from controller 32 and which can comprise any other form of controllable device, or circuit, that can initially control an amount of or rate of power transfer and that can terminate power transfer.

Where controller 32 determines that it is necessary to charge rechargeable device power supply 16, controller 32 can operate power signal generator 22 to generate a power signal that can be received by power receiving element 13 and used to charge power supply 16. On occasion, rechargeable device 12 will have a power supply 16 comprising a nickel cadmium battery. To ensure that such batteries have a long useful life, and to ensure that they maintain their storage capacity, such batteries should be recharged only where these batteries have been first drained of, substantially, all stored power. Accordingly, in one embodiment, where controller 32 determines that charging display system 10 is likely connected to a rechargeable device 12 having such a nickel cadmium battery, controller 32 can be adapted to execute a recharging strategy that first insures that such a nickel cadmium type of power supply 16 is drained of power before causing signal generator 22 to generate the power signal to charge the rechargeable device power supply 16. This can be done by reversing the charging process such that rechargeable device 12 transmits a power signal to the charging display system 10 using, for example, wireless communication system 14, or where possible by reversing the operation of power receiving element 13. In one embodiment of this type, where charging display system 10 contains a rechargeable power source 46, the process of charging a rechargeable device power supply 42 can comprise, first discharging the power from rechargeable device power supply 42 and storing it in rechargeable power source 46, then using the stored power in a subsequent recharging option.

FIG. 4B illustrates another embodiment of charging display system 10 that is generally similar to the embodiment of FIG. 4A. However, in this embodiment, control system 30 includes a power supply control circuit 52 that can control power flow along an optional direct path 53 from charging display system power supply 44 to power signal generator 22. In this way, recharging of rechargeable device power supply 42 can be performed at times when charging display controller 32 and/or rechargeable device controller 37 are not active. For example, the amount of time required to charge rechargeable device power supply 42 is typically substantially longer than the amount of time required to download data from rechargeable device memory 38 to display memory 40. Thus, it is possible to conserve energy during a charging and downloading sequence by operating control system 30 to enable controller 32 and/or rechargeable device controller 37 only where they are being used for controlling data transfer and, thereafter, disabling controller 32 and/or rechargeable device controller 37 so that they do not consume power or otherwise operate in a power conservation mode during a portion of the recharging operation wherein data is not being transferred.

Returning now to FIG. 4A, controller 32 is also used for purposes such as determining when to initiate a data exchange and/or charging sequence, cancel data exchange or and/or charging session or for adjusting a data exchange and/or transfer sequence. Display 26 can be used to provide information to a user of charging display system 10 including, but not limited to, the status of conditions in charging display system 10 and/or rechargeable device 12. For example, display 26 can provide at least one visible indication from which a user can determine, at least one of: the relative amount of power and indication of charging operations or the extent to which the process of recharging the rechargeable device power supply 42 has been completed. Typically, controller 32 will be adapted to operate display 26.

Figure 6:
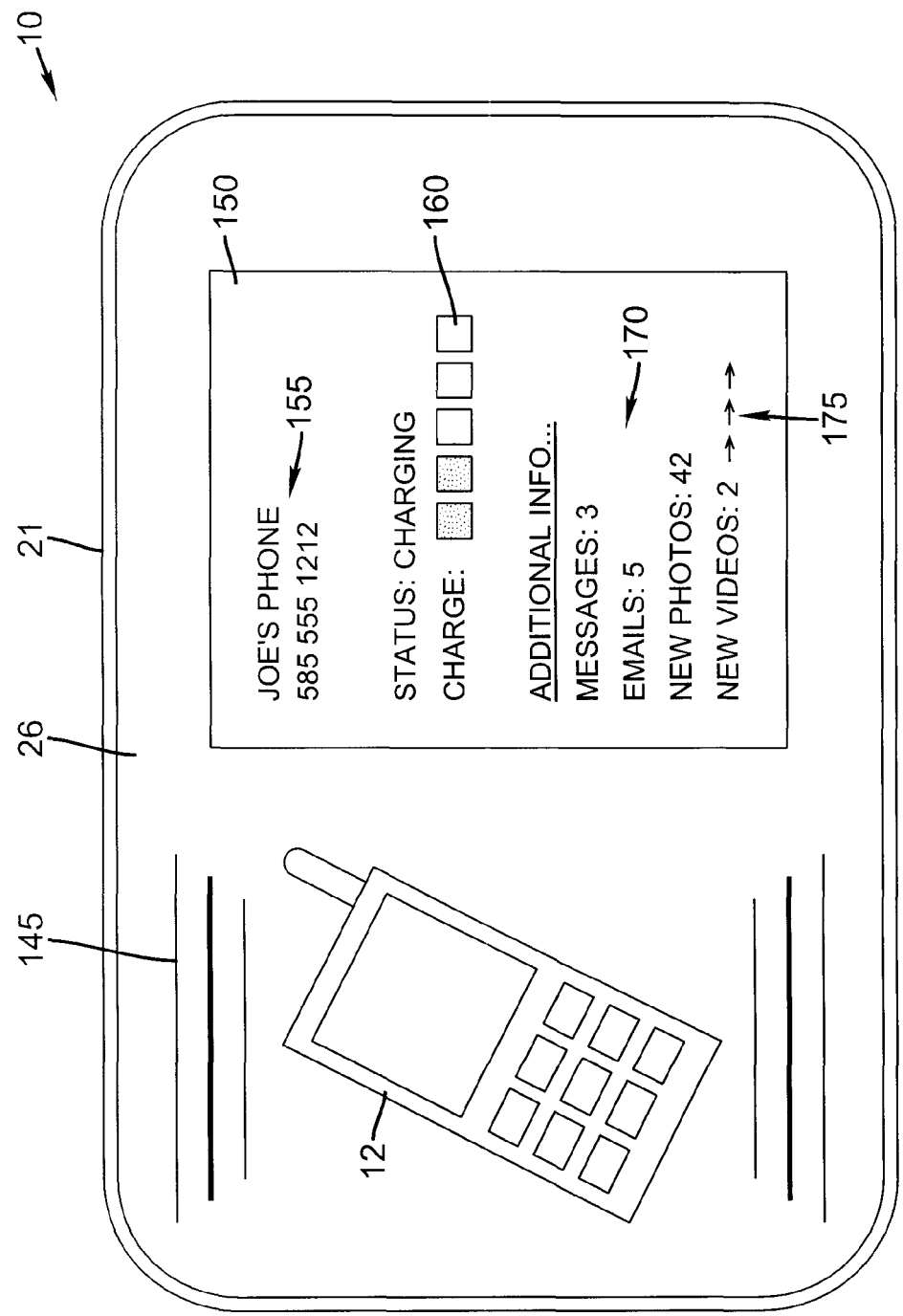
FIG. 6 is an overhead view of a rechargeable device resting on the charging display system with a display presenting an output signal.

Referring to FIGS. 4A and 6, display 26 can also provide a visible indication of the status of an action of transferring data between the rechargeable device memory 38 and the memory 40. Controller 32 will typically be adapted to operate the transfer status indicator to provide an accurate indication of the status of the data and power transfer.

Charging display system memory 40 can take any of a variety of forms. Charging display system memory 40 can comprise an internal memory device that is incorporated into charging display system 10 and is difficult to remove from connector-less charging system 20 or charging display system memory 40 can comprise a memory that is adapted for easy removal from charging display system 10, or any combination thereof. For example, in one embodiment, dock memory comprises both of a hard disk drive such as an IBM Microdrive™ with a large disk drive capacity, for example, >10 GB and a removal memory such as a Compact-Flash or secure digital memory card. Charging display system memory 40 can take other forms, and can comprise, for example, an optical disk writer adapted to convert image related content received by charging display system 10 into optically encoded data record on a disk such as a digital versatile disk or a compact disc. Charging display system memory 40 can also take the form of semiconductor memory and/or other forms of memory capable of storing digital data. It will be appreciated that the relationship between the memory storage capacity of charging display system memory 40 and the memory storage capacity of rechargeable device memory 38 determines, in general, the number of times that image related data from rechargeable device memory 38 can be downloaded to charging display system memory 40 before display system memory 40 is fully utilized.

Charging display system 10 will typically have a memory 40 with sufficient memory capacity to store image related data provided by rechargeable device 12 in multiple downloading sessions such as a memory capacity that is a multiple of the memory capacity of rechargeable device memory 38. However, in other embodiments, charging display system 10 will have memory 40 with a memory capacity that is equal to or even less than the memory capacity of rechargeable device memory 38. Such an arrangement can, nevertheless, be useful in enabling a user of portable electronic device 12 to effectively extend the image storage, capture and presentation capacity of rechargeable device 12 to a meaningful extent while offering a light weight, low cost and/or small sized charging display system 10. In any embodiment, the memory capacity of charging display system memory 40 can be effectively augmented by sharing or storing.

A user can manually designate what content stored in portable rechargeable electronic device 12 is to be uploaded to charging display system 10. This can be done by way of loading a profile of information into charging display system 10. Alternatively, charging display system 10 can have a control system 30 that is adapted determine alone, or in combination with rechargeable device controller 37 when portable rechargeable electronic device 12 has data stored in the rechargeable device memory 38 that has not yet been stored in charging display system memory 40 and that is adapted to automatically cause such data to be stored in memory 40. In certain embodiments, controller 32 can be further adapted to cause selected data to be removed from rechargeable device memory 38 after the image related data has been successfully transferred to charging display system memory 40.

It will be appreciated that in one embodiment, charging display system 10 provides a measure of protection for rechargeable device 12 when rechargeable device 12 is located confronting contact surface 11. For example, charging display system 10 of FIG. 1 can have a cover (not shown) and body 21 that are adapted to provide vibration stability when charging display system 10 is used in an automotive application.

It will be appreciated that, in other embodiments, charging display system 10 can provide additional functionality. For example, as shown in FIG. 4A, charging display system 10 provides an additional connector 90, or wireless connection, adapted to engage an external data device 92, such as the personal computer shown in FIG. 4A, a kiosk (not shown), an image viewer (not shown), a computer network (not shown), a communication system such as a wired telephone (not shown), a personal digital assistant (not shown), or like circuit or system. This can comprise, for example, a conventional RS 232 connection, a Universal Serial Bus (USB) connector, an Ethernet connection, a FireWire connection, traditional telephone line or the like. This enables charging display system 10 to be connected directly to a personal computer, kiosk, or like device for uploading of images from charging display system memory 40 to such a personal computer or kiosk.

In certain embodiments, charging display system 10 can also use additional connector 90 to receive power directly from the external data device 92 for providing recharging power to an embodiment of charging display system 10 having a rechargeable power source 46. For example, the USB system provides a line that can convey limited amounts of power from a personal computer or other USB enabled device through the USB connection. This limited amount of power can be used to charge rechargeable power source 46 over time.

Furthermore, charging display system 10 is connected to an external data device 92 and functions in a manner allowing convenient transfer of data from rechargeable device 12 to external data device 92. Further, rechargeable power source 46 can be recharged with power supplied, for example, by an external power source 5, with power supplied by external data device 92 or some combination thereof.

Also shown in FIG. 4A is a wireless communications system 94, such as a cellular telephone, or paging communication system. Such a system can be used by charging display system 10 to automatically upload image related data from system memory 40 to a remote server or to the rechargeable device 12. In this way, controller 32 can determine when the amount of data stored in charging display system memory 40 exceeds a threshold and can automatically cause data to be transferred from charging display system 10 to a external device such as a computer, network or kiosk, or other like device so as to make additional memory capacity available for storage of later obtained image related data.

Alternatively, wireless communication system 94 can comprise a wireless communication system such as a radio frequency, non-radio frequency, or other wireless electromagnetic signal, infrared or other wireless communication system that can communicate with rechargeable device 12, through the display via the use of display illumination system 23 or connector-less charging element 24, or can otherwise do so using display 26. In addition, a wireless communication system 94 may communicate with a personal computer, kiosk or the like for transferring data.

A video signal generator 98 can also be provided that is adapted to generate video output signals representative of image data, or other data, generated by control system 30 or stored in the charging display system memory 40 and that is further adapted to enable an the display 26 or an external display device 100 to receive the video output signals so that an external display device 100 can be used to present images, such as images that are representative of the images stored in the charging display system memory 40 to a television or other external video.

As is also shown in FIG. 4A, charging display system 10 can also comprise an audio signal generator 102 adapted to generate audio output signals representative of sound stored in the display memory or resident on the portable charging device and an output circuit adapted to enable an external device to receive the audio output signals so that the external device can present sound representative of audio data, such as sound data, that is stored in the charging display system memory 40 or rechargeable device memory 38.

As is further shown in the embodiment of FIG. 4A, charging display system 10 can have a signal processor 104 adapted to modify image, audio or other data, such as by adjusting the data compression strategy used for storing the data or by adjusting the content of the data scene duration. Examples of such content based adjustments include, but are not limited to, scene sequencing, aspect ratio information, rotation, apparent magnification, or crop adjustment, color correction, exposure correction, red eye correction, and/or adjusting the image related data by inserting text, graphics, or metadata in the image related. Charging display controller 32 can also be used for such purposes.

As is further shown in FIG. 4A, charging display system 10 can further comprise other sensors 110 comprising, for example, vibrational sensors, audio sensors, temperature sensors, pressure sensors, and/or other environmental sensors and the like.

It is noted, that the charging display system 10 may additionally provide room for storage of other items, such as retractable power cord 7, data cables, the portable rechargeable electronic device's operation manual, and the like.

Figure 5:
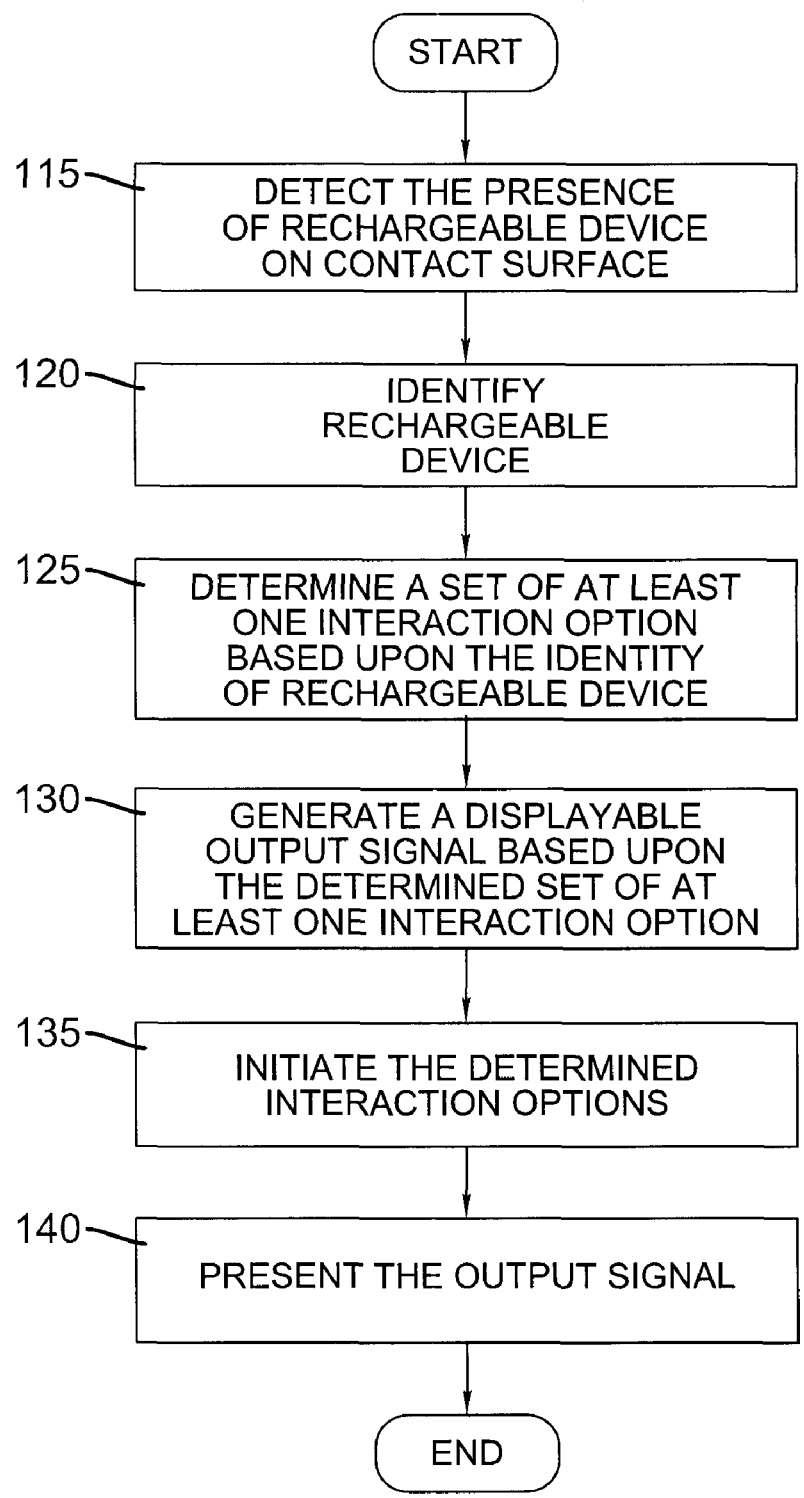
FIG. 5 is a flow diagram of one embodiment of a method for operating a charging display system.

FIG. 5 is a flow diagram of one embodiment of a method for operating a charging display system 10 having a charging system that is capable of wirelessly charging a rechargeable device 12 when rechargeable device 12 is positioned on contact surface 11. In step 115, presence of rechargeable device 12 on contact surface 11 is detected. This can be done in a variety of ways. In some embodiments, charging display system 10 can have sensors that can determine when rechargeable device 12 is located on contact surface 11. In such embodiments, rechargeable device 12 transmits a presence indicating signal that charging display system 10 can detect and can use to determine therefrom that rechargeable device 12 is on contact surface 11. In other embodiments, rechargeable device 12 can periodically generate a signal such as an audible, electromagnetic, vibration, optical or other signal that can be sensed by sensors (e.g. device sensors 29 or other sensors 110) in the charging display system 10. For example, a cellular phone periodically emits a brief signal identifying itself to local cellular telephone towers. These can be sensed by the charging display system 10 and used to determine the presence of the rechargeable device 12.

In other embodiments, charging display system 10 can be adapted to sense the presence of rechargeable device 12. In one embodiment, charging display system 10 generates a signal that is transmitted through contact surface 11. When a rechargeable device 12 is located on contact surface 11 this signal is reflected, modulated, or otherwise impacted by the presence of rechargeable device 12. The changes in the signal can be detected by device sensor 29 or other sensors 110 in charging display system 10. For example, as discussed above, primary display illumination system 23 or connector-less charging element 24 can generate light periodically and device sensor 29 can detect light reflected by rechargeable device 12.

In still other embodiments, power signal generator 22 and/or device sensor 29 can be used to sense the presence of rechargeable device 12. For example, where an inductive charging is used, an AC signal can be supplied by power signal generator 22 along the inductors periodically and the presence of rechargeable device 12 can be sensed from the presence of an inductive load. Similarly, rechargeable device 12 can sense the transmitted signal and generate a feedback signal in a form that charging display system 10 can receive and interpret to determine the presence of rechargeable device 12.

In further embodiments, the presence of a rechargeable device 12 can be detected by causing charging display system 10 to periodically generate a local signal that is adapted to provoke a response from rechargeable device 12 and detecting the provoked response. For example, charging display system 10 can use wireless communication system 94 to generate a Bluetooth signal causing the rechargeable device 12 to respond with a Bluetooth signal that can be sensed by wireless communication system 94. Similarly, charging display system 10 can generate a stimulating signal causing the cellular phone embodiment of rechargeable device 12 to generate a detectable output signal. For example, the stimulating signal can comprise a signal that simulates an incoming telephone call, causing rechargeable device 12 to generate an output signal, such as a phone ring or vibration, that can be detected by sensors 110 of charging display system 10.

The charging display system 10 identifies rechargeable device 12 (step 120). This can be done in a variety of ways using any form of communication that can be made between charging display system 10 and rechargeable device 12 including, but not limited to, the use of wireless communication schemes such as radio frequency, RFID, bar codes, unique reflective surface combinations and the like. It will be appreciated that one or more of the components used by charging display system 10 to display images, charge rechargeable device 12 or to communicate wirelessly with rechargeable device 12 can be used to exchange data sufficient to identify the rechargeable device.

In certain embodiments, rechargeable device 12 can be identified using the same systems, signals and/or methods that are described above as being used to determine the presence of rechargeable device 12 on contact surface 11. Optionally, such identification information can be encoded or determined as a part of detecting the presence of the rechargeable device 12 (Step 115) and that the methods discussed with respect to detecting such presence can also be used to determine the type of device.

It will be appreciated that rechargeable device 12 can be identified in any number of ways including, but not limited to, uniquely identifying the rechargeable device 12, such as by an electronic serial number or other form of unique identification, or by device type, an identification of the device owner, or identification of unique device characteristics, etc.

In Step 125, interaction options are determined based upon the identity of rechargeable device 12. As generally defined herein, such interaction options relate to any possible interaction the combination of rechargeable device 12 and charging display system 10 may have. The options can include operational interactions such as those that are related to the operation of rechargeable device 12 such as diagnostic testing, software, firmware and/or operation system upgrading, and charging operations. The interaction options can include data exchange and transfer options such as those that indicate the presence of data on the rechargeable device that is available for downloading or the availability of data to be transferred to rechargeable device 12. Such data can comprise any form of digital data including, but not limited to, still image data, text data, and data characterizing other forms of static graphic images, data representing sequences of still images, video data including, but not limited to, MPEG 4, Quicktime or other video image data, consumable consumption data representing an amount of a consumable used by the rechargeable device 12, such as for example, ink, pigment, receiver material used by a printer, a number of hours of operation of a device having a limited life such as a vacuum bag, or other information characterizing for example usage patterns, damage or other factors related to the device.

For example, such interactions can involve or occasion the presentation of information on display 26 such as can occur in support of recharging operations. More specifically, before, during or after recharging has begun, controller 32 can cause display 26 to present information on display 26 indicating charging modalities, voltage requirements, battery type, battery condition charge level, charge status or that indicate to a user any manner of information related to the recharging process and/or any other interactions that involve or that are related or that occur as a result of the location of rechargeable device 12 on charging surface 11 of charging display system 10 including, but not limited to, any form of communication that facilitates, supports or otherwise is related to any interaction between rechargeable device 12 and charging display system 10.

The interaction options can also involve the provision of instructions occasioning a specific use of the rechargeable device 12. For example, some rechargeable devices are password protected so that they enable certain functions to be executed only when these rechargeable device 12 have had particular codes entered into them using the user control system 60 of such a rechargeable device. Accordingly, the interactions can involve presenting specific information or requests that enable a user to more easily know when to enter the password and how to do this. Such a result is particularly valuable during a first time use or a first time of recharging of rechargeable device 12.

Similarly, the interaction options can involve diagnostic interactions wherein a user is called upon to make specific entries at the user control system 60 of rechargeable device 12 so that the reaction if any of rechargeable device 12 to such inputs can be sensed for example by wireless communication system 94 or device sensor 29 of charging display system 10 allowing such a reaction or the absence of such a reaction to be detected.

Finally, it will be appreciated that the interaction options can also involve operations related to integrating the functionality of the devices. For example, the interaction options can include interactions where features of the rechargeable device and charging display system 10 cooperate to provide functionality that is greater than either device is capable of providing. For example, wireless communication system 14 can be of a type that is different than wireless communication system 94. Thus, each enables a different form of wireless communication but neither offers both. When these devices are functionally integrated, either form of wireless communication can be enabled. It will be appreciated that a wide variety of options are available when the devices are integrated.

Determination of the interaction options can be made in a variety of ways using the device identification. In one example, each identification can contain data that inherently indicates the type of interaction options available with rechargeable device 12. In another example, the determined identity of the rechargeable device is applied against a look up table or other logic structure that associates the determined identity of the device with a set of interaction options. In still another embodiment, the identity of the rechargeable device may indicate a location where information regarding the interaction options can be found, such as a particular memory location in charging display system 10, in a computer such as external data device 92 to which charging display system 10 is connected or a network address that network interface 101 can use to obtain information identifying the interaction options.

The interaction options are used to generate a displayable output signal (step 130). This process typically involves using the determined interaction options to select visual information for presentation on display 26 and generating a displayable output signal based upon the obtained visual information. The displayable output signal is intended to provide information that facilitates or that indicates that one or more of the determined interaction options is available for execution, is being executed, requires additional information, requires user interaction, is in process or has completed executing.

There are a variety of ways in which this can be done. In one embodiment, this can be done by comparing each interaction option to a library of visual information that is associated with the set of determined interaction options and determining a displayable output signal based upon the visual information derived from the library. Such a library may comprise a look up table or other logic structure that associates the determined identity of the device with a set of interaction options and may be located in memory 40 of charging display device 10 or in a memory 38 of rechargeable device 12. In still another embodiment, the determined interaction options can be provided to a location where visual information is contained from which a displayable output signal can be generated such as a particular memory location in charging display system 10, in a computer such as external data device 92 to which charging display system 10 is connected or a network address that network interface 101 can use to obtain information identifying the interaction options. Alternatively, controller 32 can execute algorithms that automatically generate the displayable output signal based upon the determined interaction options.

The displayable output signal can comprise static and dynamically adjustable display areas including, for example, static format and labeling defining areas in which variable information such as charging status or download status information can be presented. The displayable output signal can also be completely dynamic with displayed features adjusting to the determined presence and identified type of the displayable output signal.

The determined interaction options are automatically initiated (step 135) and the determined output signal is presented on the display (step 140) in support of the determined interaction options. Examples of various types of output signals and interaction options are provided in FIGS. 6-9.

FIG. 6 is an overhead view of a rechargeable device 12, resting on connector-less charging system 20, and display 26 illustrating display menu 150. In this example, interaction options are determined that include charging, message reporting, and picture and video data transfer. As is shown in FIG. 6, a display menu 150 presents data related to these interaction options including: charging status indicator 160, an enlarged version of the rechargeable device-specific contents display indicator 170, an uploading and downloading indicator 175 having arrows that provide visual feedback associated with data transfer while dynamic charging indication 145, provides a graphical display indicating the charging process is continuing and also indicating that an area of the contact surface 11 is being used for this purpose.

Figure 7:
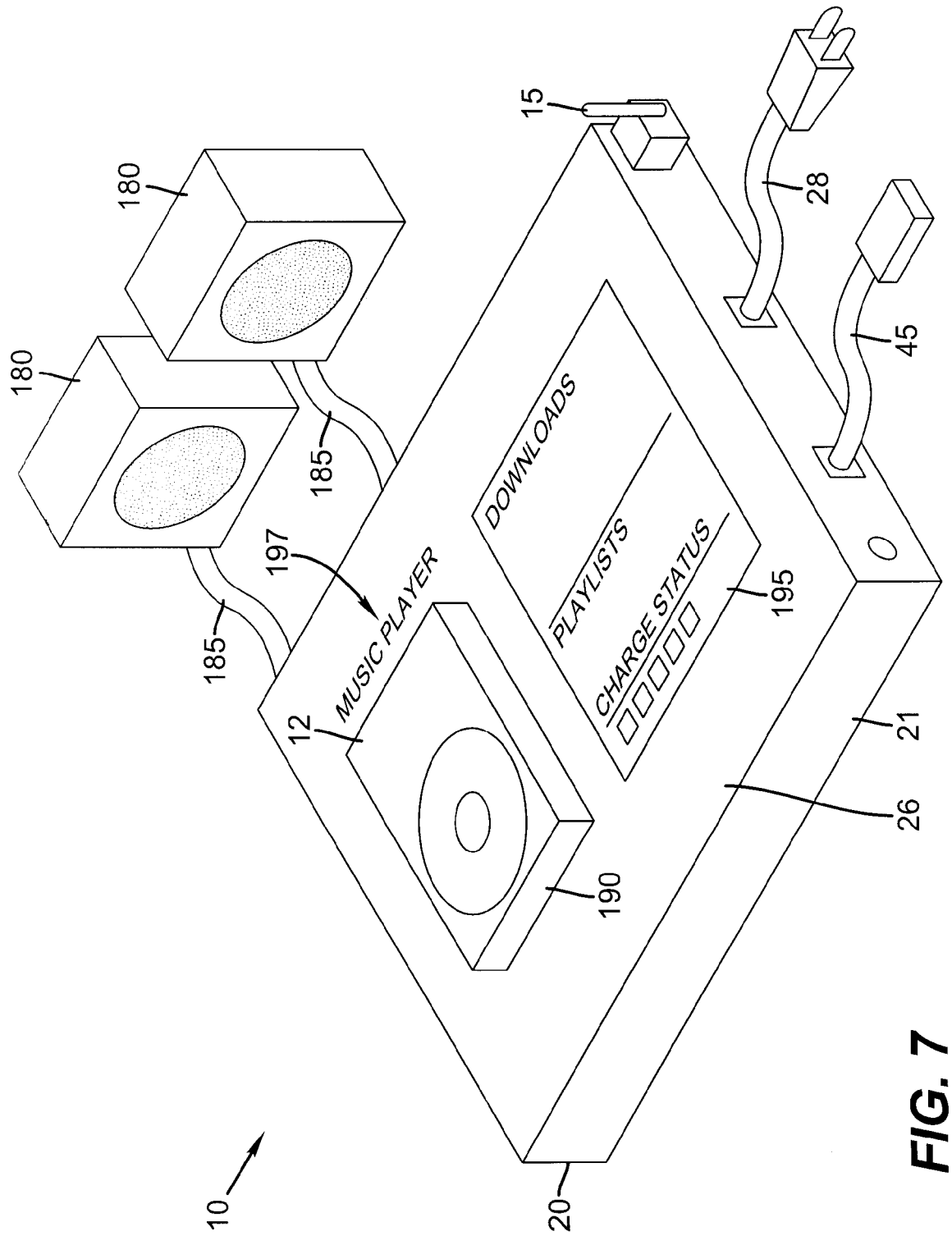
FIG. 7 shows a perspective view of the rechargeable device with power and multiple network connection types and, with a display presenting an output signal.

FIG. 7 is another embodiment of rechargeable device 12 in the form of a music player that may or may not incorporate a display for either cost or size requirements. Here the interactions with rechargeable device 12 include recharging audio download and play list presentation. Accordingly, charging display system 10 and display 26 presents the device identification 197, while UI display 195 presents information related to these functions. Further, UI display 195 can be used to enable the device to communicate with home, public or private wireless networks via wireless communication antenna 15, communication networks such as the internet via data communication cable 45 for the purposes of sharing, exchanging or obtaining songs, podcasts, media or other data. In addition, in this embodiment, charging display system 10 is equipped with speaker wires 185 and speakers 180 for purposes of headphone free playback and operation before, during or following the charging operation.

FIG. 8 illustrates a perspective view of an embodiment of a charging display system 10, containing a plurality of rechargeable devices 12, first, second, third and fourth personal hygiene devices 200, 205, 210, 215, respectively. In this embodiment, a device holder 230 attaches to body 21 of charging display system 10 via a common attachment snapping or connection structure 235. In this embodiment, the determined interaction options can include device status, and device usage and wear report. The displayed output signal provides a device identification display area 240 that enables a user to know what brush is used and device usage area 245 may display device usage time, wear and usage of consumables and the like. It will be appreciated from FIG. 8 that in other embodiments the rechargeable device 12 can take other forms, such as power tools, kitchen appliances, hand tools, etc.

It will be appreciated that any given interaction option may be associated with more than one displayable signal such as where usage time of the consumable, wear characteristics, required maintenance, and time of use information is to be provided.

The invention has been described in detail with particular reference to certain preferred embodiments thereof, but it will be understood that variations and modifications can be effected within the spirit and scope of the invention.

Parts List 5 power source
7 power cord
10 charging display system
11 contact surface
12 rechargeable device
13 power receiving element
14 rechargeable device wireless communication system
15 wireless communication antenna
16 rechargeable device power supply
20 connector-less charging system
21 body
22 power signal generator
23 display primary illumination system
24 connector-less charging element
25 infrared communication port
26 display
27 light guide
29 device sensor
30 control system
32 charging display controller
35 wired connector
37 rechargeable device controller
38 rechargeable device memory
40 charging display system memory
42 rechargeable device power supply
44 charging display power supply
45 data communication cable
46 rechargeable power source
48 recharging system
52 power supply control circuit
53 path
60 user control system
90 additional connector
92 external data device
94 wireless communication system
98 video signal generator
100 external display device
101 network interface
102 audio signal generator
104 signal processor
110 other sensors
115 detection step
120 identification step
125 determination step
130 display signal step
135 initiate interaction options step
140 display presentation step
145 dynamic charging indication
150 display menu
155 device identification indicator
160 charging status indicator
170 contents display indicator
175 uploading and down loading indicator
180 speakers
185 speaker wires
190 music player
195 UI display
197 device identification
200 first personal hygiene device
205 second personal hygiene device
210 third personal hygiene device
215 fourth personal hygiene device
230 device holder
235 connection structure
240 device identification display area
245 device usage area

The invention claimed is:

1. A method for operating a charging display system comprising the steps of:
    detecting the presence of a chargeable device on a connectorless charging surface;
    identifying the type of the chargeable device using a plurality of different local signals emanating from the charging system to provoke a response for the rechargeable device and detecting the provoked response in the charging display system;
    determining a set of interaction options based upon the identified type of chargeable device with the set including a charging interaction option;
    generating a displayable output signal based upon the determined set of interaction options;
    initiating the set of interaction options based upon the detected presence of the chargeable device on the charging surface and the identified device type; and
    presenting the output signal on a display of the charging device.

2. The method of claim 1, wherein the output signal comprises an indication for the transfer of data between the charging device and the rechargeable device.

3. The method of claim 1, wherein the output signal provides a transitory visual effect based upon at least one characteristic of the initiated charging operation.

4. The method of claim 1, wherein the charging surface confronts a recharging element of the rechargeable device.

5. The method of claim 1, wherein the charging surface is substantially co-planar with a display that is adapted to present images based upon the output signals.

6. The method of claim 1, wherein the charging surface senses contact with a recharging surface of the rechargeable device, and wherein the step of detecting the presence of a rechargeable device on the charging surface is performed by sensing the contact between the recharging surface and the charging surface.

7. The method of claim 1, wherein the charging display senses a relative location of contact surface and a recharging surface of the rechargeable device, and wherein said output signal is modified in accordance with the relative location to respond to the presence of the device.

8. The method of claim 1, further comprising the steps of establishing a communication link with external devices other than the rechargeable device, and exchanging data using the communication link to exchange data between the rechargeable device and the external devices.

9. The method of claim 8, wherein the exchanged data includes at least one of still image data, video data, audio data, graphic data, preference information, usage information, and telecommunication information.

10. A charging display system for a wirelessly rechargeable device, the charging system comprising:
a contact surface against which the wirelessly rechargeable device can be positioned;
a power signal generator capable of generating a wireless power signal;
a display positioned between the contact surface and the power signal generator;
a communication system adapted to send data to or to receive data from the wirelessly rechargeable device; and
a control system that determines when the rechargeable device is positioned against the contact surface, said control system further identifying the rechargeable device using a plurality of different local signals emanating from the charging display system to provoke a response from the rechargeable device and detecting the provoked response in the charging display system and determining a set of interaction options based upon the identity of the rechargeable device with the set, including a charging interaction option, and generating a displayable output signal based upon the determined set of interaction options,
with the control system further causing the signal generator and communication system to operate to initiate the set of interaction options; and to cause the display to present the output signal.

11. The charging display system of claim 10, wherein the power signal generator charges the rechargeable device using at least one of light, radio-frequency signals, inductive signals, kinetic, magnetic, and electromagnetic energy transfer.

12. The charging display system of claim 10, wherein the set of interaction options further includes a data transfer function.

13. The charging display system of claim 10, further comprising a device detector adapted to receive a power signal from the rechargeable device so that the amount of power in a power supply of the rechargeable device can be fully drained prior to charging.

14. The charging display system of claim 13, wherein the communication system comprises the control system wherein the control system is adapted to operate the power signal generator and the detection circuit so that data can be exchanged using power signals.

15. The charging display system of claim 13, wherein the signal generator is adapted to selectively provide power across all or a portion of the contact surface, and further comprising device sensors that are adapted to sense the location of the rechargeable device on the contact surface and wherein the controller is adapted to use the sensors to detect the presence of and location of the rechargeable device on the contact pad and the signal generator generate a signal that provides a level of power sufficient to charge the rechargeable device to the detected location.

16. The charging display system of claim 13, wherein the interaction options include a charging interaction and a data transfer interaction wherein data is transferred either to or from the rechargeable device and wherein the displayable signal indicates the extent of the data transfer.

17. The charging display system of claim 10, wherein the display and the power signal generator are co-designed so that the power signal can pass through the display with low signal loss.

18. The charging display system of claim 10, wherein the control system comprises a controller and a power supply controller, and wherein said power supply controller is adapted to initiate the charging, to control charging or to terminate charging without instruction from controller so that the controller can be maintained in a power conservative mode of operation during, at least a portion of, the charging of the rechargeable device.

19. A charging display system for use with a rechargeable electronic device comprising:
a power supply means;
a contact surface against which the rechargeable electronic device can be positioned for charging;
a connector-less means for data and power to be exchanged therethrough with the rechargeable electronic device;
a control means for controlling the exchange of power and data through the connector-less interface; and
a display positioned between the connector-less means and the contact surface that communicates at least one of power or data exchange,
wherein said control means uses said connector-less means to determine an identity for the rechargeable device, and uses the identity to determine power and data exchange to be executed; and
the control means comprises a data exchange controller and a power exchange controller, wherein said power exchange controller initiates the charging, to control charging or to terminate charging without initiating the data exchange controller to maintain the charging display system in a power conservative mode of operation during, at least a portion of, the charging of the rechargeable device.

* * * * *